(12) United States Patent
Perng et al.

(10) Patent No.: US 6,375,869 B1
(45) Date of Patent: Apr. 23, 2002

(54) AB$_5$-TYPE RARE EARTH TRANSITION INTERMETALLIC COMPOUNDS FOR THE NEGATIVE ELECTRODES OF RECHARGEABLE BATTERIES

(75) Inventors: Tsong P. Perng, Hsinchu (TW); Bao-Min Ma, Apex, NC (US); James Landi, Tempe; Qun Chen, Peoria, both of AZ (US)

(73) Assignee: Santoku Corporation, Kobe (JP)

( * ) Notice: Subject to any disclaimer, the term of this patent is extended or adjusted under 35 U.S.C. 154(b) by 0 days.

(21) Appl. No.: 09/492,869

(22) Filed: Jan. 27, 2000

Related U.S. Application Data
(60) Provisional application No. 60/117,832, filed on Jan. 29, 1999.

(51) Int. Cl.$^7$ .............................. H01B 1/08; C22C 19/03; H01M 4/52
(52) U.S. Cl. ..................... 252/521.1; 429/223; 420/435; 420/443
(58) Field of Search ...................... 252/521.1; 204/293; 429/128, 223; 420/416, 435, 443

(56) References Cited

U.S. PATENT DOCUMENTS

| | | |
|---|---|---|
| 4,814,002 A | 3/1989 | Grasselli et al. |
| 4,902,579 A | 2/1990 | Grasselli et al. |
| 5,008,164 A | 4/1991 | Furukawa et al. |
| 5,242,656 A | 9/1993 | Zhang et al. |
| 5,354,576 A | 10/1994 | Zhang et al. |
| 5,501,917 A | 3/1996 | Hong |
| 5,541,017 A | 7/1996 | Hong et al. |
| 5,556,719 A | 9/1996 | Hong et al. |
| 5,578,266 A | 11/1996 | Takai et al. |
| 5,654,115 A | 8/1997 | Hasebe et al. |
| 5,695,530 A | 12/1997 | Hong et al. |
| 5,738,958 A | 4/1998 | Lichtenberg |
| 5,753,386 A | 5/1998 | Inaba et al. |
| 5,766,799 A | 6/1998 | Hong |
| 5,817,222 A | 10/1998 | Kaneko |
| 5,840,166 A | 11/1998 | Kaneko |
| 5,840,440 A | 11/1998 | Ovshinsky et al. |
| 5,843,372 A | 12/1998 | Hasebe et al. |
| 5,888,665 A | 3/1999 | Bugga et al. |
| 5,910,379 A | 6/1999 | Kasashima et al. |
| 5,922,146 A | 7/1999 | Lee et al. |
| 5,932,369 A | 8/1999 | Komada et al. |
| 5,964,965 A | 10/1999 | Schulz et al. |
| 6,013,387 A | 1/2000 | Yao et al. |

FOREIGN PATENT DOCUMENTS

| | | | |
|---|---|---|---|
| WO | 00/44951 | * | 8/2000 |

* cited by examiner

*Primary Examiner*—Mark Kopec
(74) *Attorney, Agent, or Firm*—Stevens, Davis, Miller & Mosher, LLP

(57) ABSTRACT

Manganese-free rare earth-transition metal AB$_5$-type hydrogen-absorbing alloys having favorable high rate discharge characteristics, suitable for use in rechargeable batteries for electrical vehicles or hybrid electrical vehicles, include compositions of the general formula: $R(Co_uAl_vM_wNi_{1-u-v-w})_z$, where R is at least one element selected from rare earth elements and yttrium (Y), M is at least one refractory metal selected from Groups IVB, VB, and VIB of the periodic table, the value of u is from 0 to about 0.25, v is from 0 to about 0.10, w is from 0 to about 0.05, and z, the ratio of $R(Co_uAl_vM_wNi_{1-u-v-w})/R$, is from about 4.70 to about 5.50. The unit cell volume is from about 87 to about 88.5 Å$^3$ at 25° C., the plateau pressure is from about 3 to about 10 apsi at 25° C., and the composition is essentially free of manganese.

25 Claims, 5 Drawing Sheets

AB₅-TYPE RARE EARTH TRANSITION INTERMETALLIC COMPOUNDS FOR THE NEGATIVE ELECTRODES OF RECHARGEABLE BATTERIES

This application claims the benefit of U.S. Provisional Application No. 60/117,832, filed Jan. 29, 1999, incorporated herein by reference.

BACKGROUND OF THE INVENTION

1. Field of the Invention

The present invention relates to hydrogen-absorbing alloys suitable for use in batteries and in methods of manufacturing batteries. More particularly, the invention relates to Mn-free rare earth-transition metal AB₅-type materials which have favorable high rate discharge characteristics and are suitable for use in rechargeable batteries.

2. Description of Related Art

Classes of metal hydride alloys for battery applications include AB alloys (e.g., TiNi), A₂B alloys (e.g., Ti₂Ni), AB₂ alloys (e.g., ZrMn₂), AB₅ alloys (e.g., LaNi₅) and complex alloys (e.g., V—Ti—Zr—Ni). Among these hydrogen-absorbing alloy systems, AB₅ is the most attractive alloy system for battery applications because of its favorable environmental characteristics. These alloys lessen the environmental pollution which may be caused by conventional cadmium-based batteries and the like.

LaNi₅ has been known to exhibit a theoretical hydrogen storage capacity of about 372 mAh/gm. This high storage capacity enables, in principle, this compound to be an attractive material for the negative electrode of rechargeable batteries. However, the high plateau pressure and poor long-term stability (cycle life) prohibit LaNi₅ from practical use in rechargeable batteries. To overcome these drawbacks, many rare earth and transition metal substitutions have been developed to lower the plateau pressure and to extend the cycle life.

Commercial AB₅ hydrogen absorbing alloys usually consist of misch metal for the rare earth component (the A part) and Co, Al, Mn and Ni for the transition metal component (the B part). Alloys with such combinations provide increased cycle life at the cost of decreased storage capacity.

Current commercially available AB₅ hydrogen absorbing alloys are principally designed for consumer electronic appliances, such as telephone devices, which usually require a low discharge current and a low discharge rate. Recently, AB₅ alloys have been considered for use in an electrical vehicle (EV) or hybrid electrical vehicles (HEV). For such applications, batteries must be able to release a high amount of current within a very short time period. Thus, a high discharging rate is necessary and required for these applications. To fulfill the high discharging rate requirement for EV or HEV applications, the AB₅ alloys must be further modified to allow a fast transport of electrons. It is an object of the present invention to provide AB₅ hydrogen absorbing alloys suitable for EV or HEV applications and having a suitably high discharge rate. This and other objects of the present invention will become more apparent from the following description.

SUMMARY OF THE INVENTION

The present invention relates to manganese-free rare earth-transition metal AB₅-type hydrogen-absorbing alloys having favorable high rate discharge characteristics and being suitable for use in rechargeable batteries, particularly rechargeable batteries for electrical vehicles or hybrid electrical vehicles. Preferably, the hydrogen-absorbing alloys have an AB₅ structure, are essentially free of Mn and the MnNi₄ phase, and have a unit cell volume ranging from about 87 to about 88.5 A³ at about 25° C. More preferably, the hydrogen-absorbing alloys have a plateau pressure of about 1 to about 60 apsi (atmospheric pounds per square inch)(0.075 to 4.5 atm), and more preferably, at 25° C., from about 3 to about 10 apsi (0.2 to 0.8 atm).

The hydrogen-absorbing alloy compositions of the present invention are of the general formula: $R(Co_uAl_vM_wNi_{1-u-v-w})_z$, where "R" is at least one element selected from the group consisting of rare earth elements and yttrium (Y) (typically La, Ce, Pr, Nd, Pm, Sm, Eu, Gd, Tb, Dy, Ho, Er, Tm, Yb, Lu, and Y), "M" is at least one refractory metal selected from Groups IVB, VB, and VIB of the periodic table (typically, M is at least one refractory metal selected from Ti, V, Cr, Zr, Nb, Mo, Hf, Ta, and W), the value of "u" is from 0 to about 0.25, "v" is from 0 to about 0.10, "w" is from 0 to about 0.05, and the B/A ratio (i.e., $(Co_uAl_vM_wNi_{1-u-v-w})/R$), "z," is from about 4.70 to about 5.50.

DESCRIPTION OF THE PREFERRED EMBODIMENTS

Figure 1:
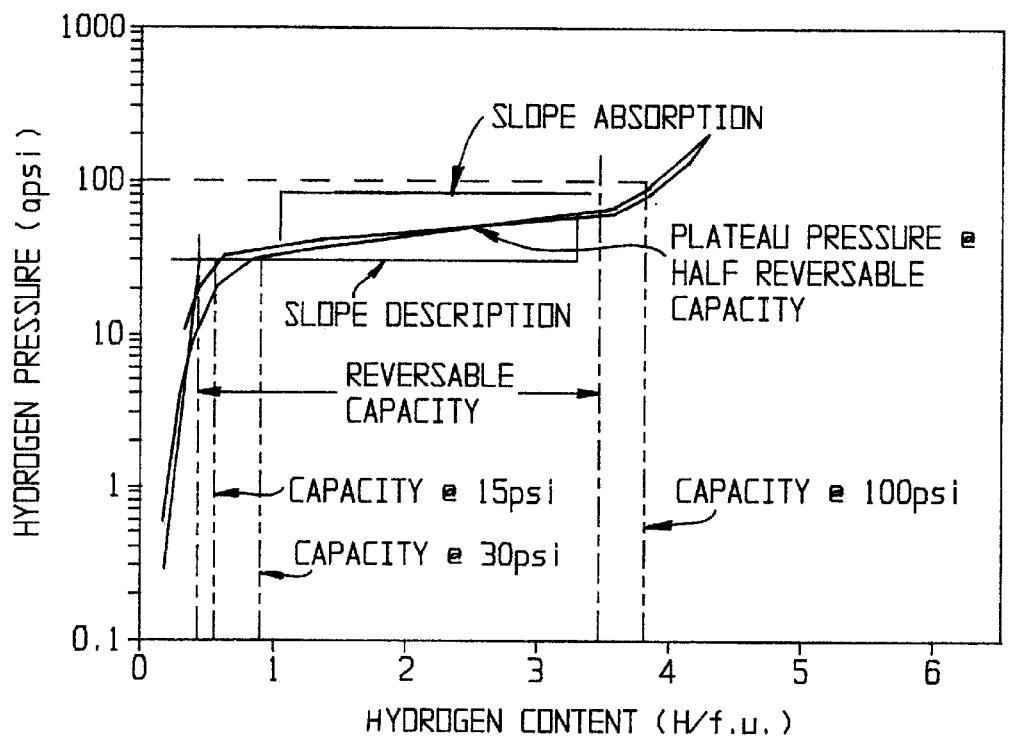
FIG. 1 is a schematic diagram of the measurement of a Pressure Composition Isotherm (PCT) in a Sievert-type gas-solid reactor.

Hydrogen-absorbing alloy powder compositions comprise an alloy having the composition represented by the general formula (I):

$$R(Co_uAl_vM_wNi_{1-u-v-w})_z \tag{I}$$

where the values of u, v, w, 1−u−v−w and z are generally in the range depicted in Table A.

TABLE A

| | Co<br>u | Al<br>v | M<br>w | Ni<br>1-u-v-w | B/A ratio<br>z |
|---|---|---|---|---|---|
| Broadest Range | 0–0.25 | 0–0.10 | 0–0.05 | Balance | 4.70–5.50 |
| Preferable | 0–0.15 | 0–0.06 | 0.005–0.03 | Balance | 4.90–5.35 |
| Most Preferable | 0–0.15 | 0–0.06 | 0.005–0.02 | Balance | 5.00–5.15 |
| Typical Range A | 0.01–0.2 | 0.001–0.05 | 0.01–0.03 | Balance | 4.85–5.45 |

TABLE A-continued

|  | Co u | Al v | M w | Ni 1-u-v-w | B/A ratio z |
|---|---|---|---|---|---|
| Typical Range B | 0.05–0.2 | 0.02–0.04 | 0.01–0.02 | Balance | 4.9–5.2 |

R is at least one element from group IIIB of the periodic table, specifically consisting of the lanthanide (or "rare earth") series, and yttrium; typically R is at least one element selected from the group consisting of La, Ce, Pr, Nd, Pm, Sm, Eu, Gd, Tb, Dy, Ho, Er, Tm, Yb, Lu, and Y; preferably R is at least one element selected from the group consisting of La, Ce, Nd, Pr, and Sm; and more preferably R is La.

M is at least one refractory metal from Groups IVB, VB, and VIB of the periodic table; preferably M is at least one refractory metal selected from the group consisting of Ti, V, Cr, Zr, Nb, Mo, Hf, Ta, and W.

The hydrogen-absorbing alloy compositions can also be expressed by the general formula (II):

$$R\, Co_u Al_v M_w Ni_{z-u-v-w} \tag{II}$$

where the values of u, v, w, 1−u−v−w and z are generally in the range depicted in Table B.

TABLE B

|  | Co u | Al v | M w | Ni z-u-v-w | z |
|---|---|---|---|---|---|
| Broadest Range | 0–1.375 | 0–0.55 | 0–0.275 | Balance | 4.70–5.50 |
| Preferable | 0–0.8025 | 0–0.321 | 0.0245–0.1605 | Balance | 4.90–5.35 |
| Most Preferable | 0–0.7725 | 0–0.309 | 0.025–0.103 | Balance | 5.00–5.15 |
| Typical Range A | 0.0485–1.09 | 0.00485–0.2725 | 0.0485–0.1635 | Balance | 4.85–5.45 |
| Typical Range B | 0.245–1.04 | 0.098–0.208 | 0.049–0.104 | Balance | 4.9–5.2 |

Examples of suitable compositions of the present invention include:

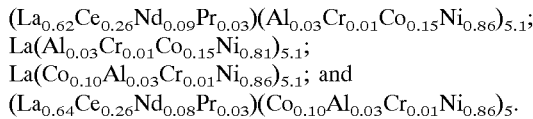

$(La_{0.62}Ce_{0.26}Nd_{0.09}Pr_{0.03})(Al_{0.03}Cr_{0.01}Co_{0.15}Ni_{0.86})_{5.1}$;

$La(Al_{0.03}Cr_{0.01}Co_{0.15}Ni_{0.81})_{5.1}$;

$La(Co_{0.10}Al_{0.03}Cr_{0.01}Ni_{0.86})_{5.1}$; and $(La_{0.64}Ce_{0.26}Nd_{0.08}Pr_{0.03})(Co_{0.10}Al_{0.03}Cr_{0.01}Ni_{0.86})_5$.

The compositions are essentially free of manganese (Mn) and the $MnNi_4$ phase. The preferred compositions have a unit cell volume ranging from about 87 to about 88.5 $A^3$ and/or a plateau pressure ranging from about 1 to about 60 apsi (0.075 to 4.5 atm), and preferably from about 3 to about 10 apsi (0.2 to 0.8 atm) at 25° C. Preferably, the compositions are in the form of a powder.

R, which represents the A component of the general formula $AB_5$, is at least one element selected from the group consisting of rare earth elements and Y (i.e., La, Ce, Pr, Nd, Pm, Sm, Eu, Gd, Tb, Dy, Ho, Er, Tm, Yb, Lu, and Y). Rare earth elements are expensive. A reduction in the cost of the hydrogen-absorbing alloy can be provided by utilizing a misch metal which is a mixture of a plurality of rare earth elements. A typical misch metal comprises about 10 to 50 wt % La, about 5 to 60 wt % Ce, about 2 to 10 wt % Pr, and about 10 to 45 wt % Nd. A misch metal having a high La content, e.g., equal to or greater than 50 wt % La, is preferred.

The components Co and Al are effective in modifying the lattice parameters of the unit cell, thus controlling the plateau pressure, and extending the life of the hydrogen absorbing alloy. One embodiment of the present invention, however, even obtains a high discharge rate and good characteristics with hydrogen-absorbing alloy compositions which are essentially free of Co.

In addition to the above, the hydrogen-absorbing alloy according to the present invention can contain as impurities at least one element selected from Pb, C, N, O, F, Cl, S, P and the like. The impurities can be present in amounts to the extent that the characteristics of the alloy of the present invention are not effected. Preferably, the impurities are present in the range of about 6000 ppm or less.

The hydrogen-absorbing alloys are essentially free of Mn. While Mn can be present as an impurity, it is preferable that the compositions do not comprise Mn.

An important characteristic of the hydrogen-absorbing alloys of the present invention is that at high discharge rates, preferably greater than about 500 mA/g, the alloys maintain excellent capacity.

The hydrogen-absorbing alloys of the present invention can be manufactured utilizing conventional methods. Preferably, a rapid quench method, such as a single roll method, double roll method and the like, is utilized. More preferably, an isothermal heat treatment at from about 900° C. to about 1100° C. for typically from about 2 to about 24 hours is utilized to improve characteristics.

A single roll manufacturing apparatus generally comprises a cooling roll made of a compound of copper, nickel or the like which possesses good thermal conductivity and a molten metal injection nozzle for injecting a molten alloy to the traveling surface of the cooling roll. The cooling roll and the like are accommodated in a cooling chamber adjusted to vacuum or in an inert gas atmosphere. Further, although the rotating speed of the cooling roll depends upon the wetting property thereof, the cooling speed and the injection amount of the alloy, it is generally set to from about 300 to about 5000 rpm. When the alloy is injected onto the traveling surface of the cooling roll through the injection nozzle, the alloy is solidified from the surface in contact with the cooling roll.

A double roll manufacturing apparatus generally comprises a pair or more of cooling rolls disposed in a cooling chamber so that the respective traveling surfaces are confronted to each other, a melting furnace for preparing the alloy by melting material metals, and a molten metal injection nozzle for injecting the alloy supplied from the melting furnace. The cooling rolls are composed of a thermally conductive material such as copper, nickel or the like. Generally, the cooling rolls are rotated at a high speed of from about 300 to about 2000 rpm. When molten alloy is injected in the direction between the cooling rolls from the injection nozzle, it is solidified from the sides in contact with the cooling roll.

A rotating disc manufacturing apparatus generally comprises a rotary disc member as a high speed rotary member disposed in a cooling chamber in an argon gas atmosphere and a molten metal injection nozzle for temporarily storing the molten alloy and further injecting same onto the traveling surface of the rotary disc member. The rotary member is usually composed of a ceramic or metal material having a relatively low wetting property to a molten metal to prevent the alloy from adhering to and solidifying on the rotary member. When injected into the traveling surface of the rotary disc, it is finely dispersed by the moving force and spheroidized by the surface tension of itself while flying in the cooling chamber without coming into contact with the inner surface of the cooling chamber and further solidified by being quenched by the atmosphere gas, such as argon gas and the like. The alloy particles are collected in a vessel placed in the bottom of the cooling chamber.

A gas atomizing apparatus generally comprises a melting furnace for heating and melting a metal material disposed in a cooling chamber in an argon gas atmosphere by a heater, a molten metal injection nozzle formed at the bottom of the melting furnace, a plurality of inert gas nozzles disposed in the vicinity of the lower end opening of the molten metal injection nozzle in confrontation therewith to inject a cooling inert gas such as argon gas or the like, and a shut-off valve for opening/closing the molten metal injection nozzle. The molten alloy is atomized and dispersed by the inert gas in the cooling chamber without coming into contact with the inner wall thereof and quenched and solidified. The resulting alloy particles have a spherical shape.

When a ribbon-shaped, flake-shaped or spherical-shaped hydrogen-absorbing alloy is made utilizing the aforesaid rapid quench methods, equi-axed crystals and columnar structure are made depending upon the conditions of the material and the cooling roll or rotating disk, quenching rate of the molten alloy and the like. A columnar structure is preferred.

Conventional vacuum induction melting and mold casting manufacturing methods can be utilized and obtain the high discharge rate and good characteristics of the hydrogen-absorbing alloys of the present invention.

In manufacturing, a molten alloy having the composition of the present invention (mother alloy) made by a casting method and melting by high frequency induction heating can be utilized. It is also acceptable to introduce the respective elements of the compositions directly into a crucible. Adjustment may be required such as by adding rare earth elements (having a high vapor pressure) in a slightly greater amount than in the alloy compositions. Thus, adjustment is made so that the change of the alloy composition caused by the volatilization of the elements is compensated for in order to preserve the target composition.

The quenching process of the molten metal is preferably conducted in an inert gas atmosphere of argon or the like and preferably in a vacuum to prevent the deterioration of the molten alloy by oxidation.

The cooling rolls are preferably made of a Cu alloy, Fe alloy, Ni alloy, Be alloy or Mo alloy. Cr plating or the like may also be used.

The isothermal heat treatment can be conducted on the as-quenched alloy or, preferably, after the as-quenched alloy has been ground or otherwise treated to obtain a suitable powder form. One skilled in the art is capable of determining the appropriate powder form.

The isothermal heat treatment is preferably conducted at from about 900 to about 1100° C. for from about 2 to about 24 hours. The treatment atmosphere is that of an inert gas or vacuum to prevent oxidation of the hydrogen-absorbing alloy at high temperature. Preferably, the heat treatment is conducted at from about 950 to about 1100° C. for about 4 to about 12 hours.

The manufactured hydrogen-absorbing alloys are preferably predominately a single phase. More preferably, greater than 10% can comprise a secondary phase.

The following examples illustrate various aspects of the present invention and are not intended to limit the scope thereof.

EXAMPLE

The PCT performance or the electrochemical test results of the present invention are produced either by conventional vacuum induction melting and mold casting or a rapid solidification technique discussed previously.

Pressure Composition Isotherm (PCT)

The PCT measurements are conducted at 25 to 50° C., using a Sievert-type gas-solid reactor (see FIG. 1).

Typically, approximately 2 grams of alloy are placed in the sample chamber and evacuated to $2 \times 10^{-2}$ torr, using a mechanical pump. Grade 5 (99.999% purity) hydrogen gas is used for all activation and PCT measurements. A tube furnace, capable of temperatures up to about 500° C., is used to control the chamber temperature for testing. A K-type thermocouple placed outside the sample chamber is utilized to determine the temperature.

Alloy Activation

Activation is done at 25° C. using a hydrogen pressure of 225 psi (approximately 15 atm). At an initial pressure of approximately 225 psi, the hydrogen incubation time is approximately 2 minutes, then the majority of activation is generally completed within 5 minutes. Due to the exothermic reaction, a temperature rise of 5° C. can be easily detected in the sample chamber. To ensure a full activation, samples are maintained under hydrogen (with the remaining hydrogen pressure) for a total of 60 minutes at room temperature.

After activation the sample chamber is heated to 100° C. to desorb the hydrogen completely ($2 \times 10^{-2}$ torr) using a mechanical pump to evacuate the desorbed hydrogen.

PCT Measurements

PCT measurements are conducted at 25 and 50° C. Hydrogen absorption and desorption capacities are determined by measuring the pressure difference between a reference chamber of constant volume and the sample chamber.

Plateau Slope

Plateau slope is defined as the slope of the flat portion of the absorption or desorption curve. The slope of the desorption curve usually determines the self discharge rate of a given alloy. Moreover, the plateau slopes also provide an indication for the homogeneity of the materials. Alloys with near single phase structure usually exhibit a flatter plateau slope.

Hydrogen Storage Capacity ($C_{th}$)

The capacity ($C_{th}$) is defined as the hydrogen storage capacity at the given pressure, 15, 30, or 100 psi, by the relationship of $C_{th}=x\ F/(3.6 M_{AB5})$ mAh/g. Where F and $M_{AB5}$ are the Faraday constant and the molecular weight of the $AB_5$ compound, and x stands for the number of hydrogen atoms per $AB_5$ as defined by $AB_5H_x$.

Reversible Capacity

Unlike the capacity, the reversible capacity is defined as the capacity between the two inflection points of the two transition portions on the desorption curves. Because of the incomplete desorption at below ambient pressure, the reversible capacity may be more representative to the actual capacity of alloy performance. Also because of the incomplete desorption below ambient pressure, the alloys may exhibit high reversible capacities at 50° C. when compared to those measured at 25° C.

Electrochemical Testing

An EG&G Model 273 Potentiostat/Galvanostat is used for constant current charging/discharging at room temperature. Alloy powder is obtained by either crushing or grinding, and passing through a 90 μm sieve. Negative electrodes are prepared, by mixing active alloy material with Inco Nickel 210 powder, in a 1:4 ratio. The material is then cold pressed at 5000 psi, for 5 minutes, using a Carver press, into a porous pellet. The pellet has a diameter of 9.5 mm, and a thickness of 1.5 mm, and contains 0.1 grams of active material. The pellet is attached to a copper rod, by silver paste and a shrink sleeve, which is soldered to a nickel wire. The negative electrode is placed in a two compartment Phillips cell, separated by porous glass ceramic. A nickel mesh is used as the counter electrode, and a Hg/HgO/6M KOH electrode as the reference. The electrolyte is a 6M KOH solution. The cell is purged with nitrogen for 1 hour, prior to testing.

Sample Activation

The theoretical capacity is determined by PCT measurements. The sample is fast charged to 80% of this capacity in 0.5 hours, then there is a five minute rest. The sample is then charged an additional 40% of capacity for 1 hour, resulting in a charge of 120% of the theoretical capacity. There is then another five minute rest, and then a discharge at 500 mA/g. This procedure is repeated for 20 cycles, to ensure complete activation. The voltage drop between the negative and reference electrode vs. time is monitored.

Rate Capability Testing

Rate capability of the alloy is determined, by discharging at 50, 100, 250, 500, 750, and 1000 mA/g each time with the 120% charging outline above. The voltage drop between the negative and reference electrode vs. time is monitored.

Results

Figure 2:
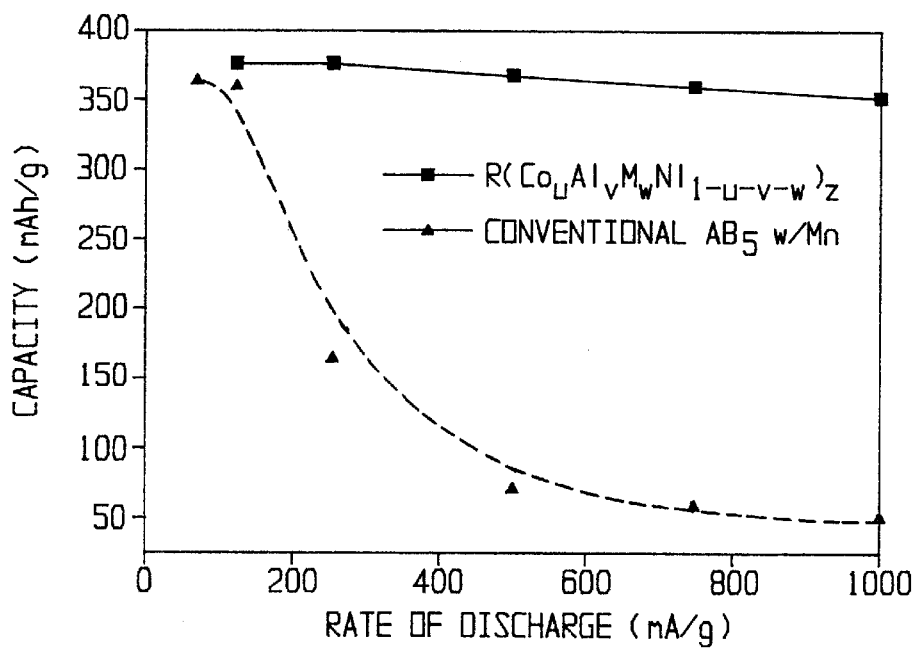
FIG. 2 is a comparison of the discharging capacity of $La(Co_{0.10}Al_{0.03}Cr_{0.01}Ni_{0.86})_{5.1}$ and $(La_{0.32}Ce_{0.49}Nd_{0.14}Pr_{0.04})(Co_{0.12}Al_{0.06}Mn0.1Ni_{0.72})_{5.1}$ at various rates of discharge.

Shown in FIG. 2 is a comparison of the discharging capacity, determined by the electrochemical testing, of an alloy of this invention with a nominal composition of $La(Co_{0.10}Al_{0.03}Cr_{0.01}Ni_{0.86})_{5.1}$ and a conventionally available $AB_5$ alloy with a nominal composition of $(La_{0.32}Ce_{0.49}Nd_{0.14}Pr_{0.04})(Co_{0.12}Al_{0.06}Mn_{0.1}Ni_{0.72})_{5.1}$. Both alloys exhibit a theoretical discharging capacity of nearly 360 mAh/gm (when extrapolated to the discharge rate of 0 mA/g). The discharging capacity of $(La_{0.32}Ce_{0.49}Nd_{0.14}Pr_{0.04})(CO_{0.12}Al_{0.06}Mn_{0.1}Ni_{0.72})5.1$ decreases nearly exponentially with the increasing rate of discharging. A discharging capacity of nearly 50 mAh/g is obtained when discharged at a rate of 1000 mA/g. Such a low discharging capacity makes this alloy unattractive for high rate application. Unlike $(La_{0.32}Ce_{0.49}Nd_{0.14}Pr_{0.04})(Co_{0.12}Al_{0.06}Mn_{0.1}Ni_{0.72})_{5.1}$, the discharging capacity of $La(Co_{0.10}Al_{0.03}Cr_{0.01}Ni_{0.86})_{5.1}$ decreases linearly when the rate of discharge is varied from 50 to 1000 mA/g. A discharging capacity of approximately 350 mA/g is obtained when discharged at 1000 mA/g. This high residual discharging capacity at a high rate of discharging enables $La(Co_{0.10}Al_{0.03}Cr_{0.01}Ni_{0.86})_{5.1}$ for EV or HEV application.

Figure 3:
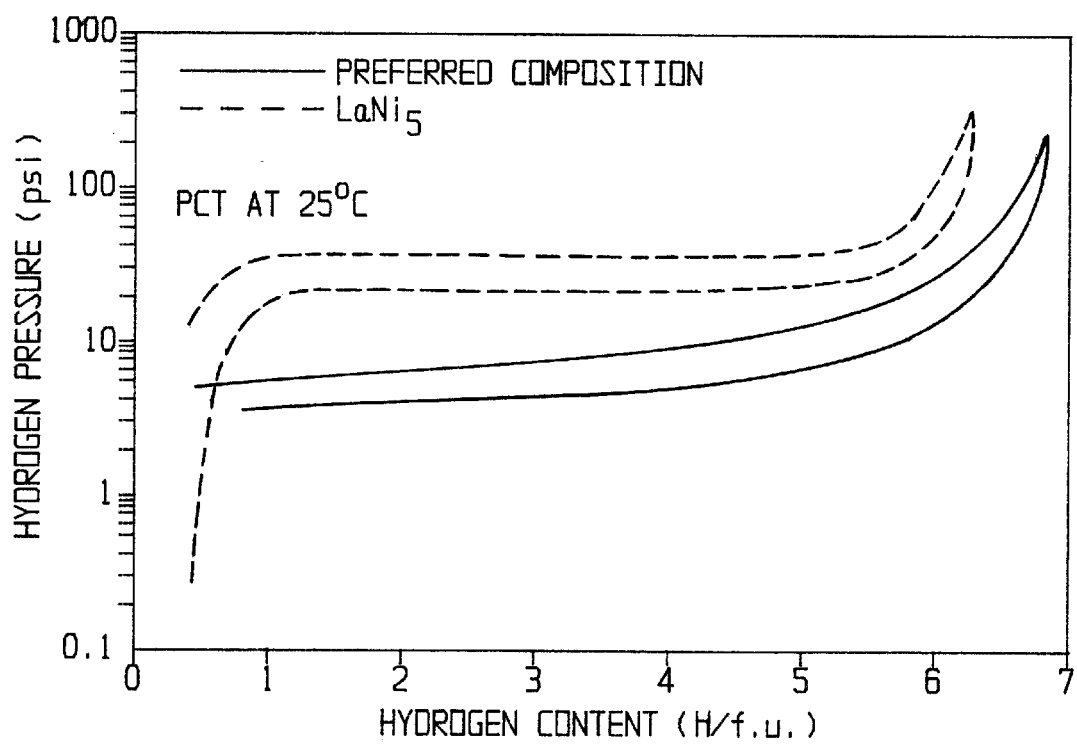
FIG. 3 is a comparison of the PCT curves of LaNi₅ and $La(Co_{0.10}Al_{0.03}Cr_{0.01}Ni_{0.86})_{5.1}$ at 25° C.

Shown in FIG. 3 are the comparative PCT curves of $LaNi_5$ and $La(Co_{0.10}Al_{0.03}Cr_{0.01}Ni_{0.86})_{5.1}$ (i.e. the alloy of this invention). As can be seen, the plateau pressure of $La(Co_{0.10}Al_{0.03}Cr_{0.01}Ni_{0.86})_{5.1}$ is significantly lower than that of $LaNi_5$. Table C presents the lattice parameters, unit cell volume, and hydrogen storage capacity of these two alloys. The unit cell volume increases from 86.68 $A^3$ of $LaNi_5$ to 87.27 $A^3$ of $La(Co_{0.10}Al_{0.03}Cr_{0.01}Ni_{0.86})_{5.1}$. This increase in the unit cell volume expands the void size around the interstitial sites of $AB_5$ (i.e., the $CaCu_5$ structure) and, subsequently, increases the hydrogen occupancy rate at interstitial sites. Moreover, the increase in the unit cell volume also lowers the plateau pressure of $La(Co_{0.10}Al_{0.03}Cr_{0.01}Ni_{0.86})_{5.1}$ without sacrificing the hydrogen storage capacity. The increase in unit cell volume also allows hydrogen atoms to enter and leave the interstitial sites of the $CaCu_5$ structure more readily and, subsequently, enable a high capacity at high rate of discharging.

TABLE C

The lattice parameters, unit cell volume and the plateau pressure of $LaNi_5$ and $La(Co_{0.10}Al_{0.03}Cr_{0.01}Ni_{0.86})_{5.1}$ measured at 25° C.

| Alloy | Lattice Parameters (Å) a | c | Unit Cell Volume $A^3$ | Plateau Pressure apsi | PCT Capacity @ 15 apsi | 30 apsi | 100 apsi |
|---|---|---|---|---|---|---|---|
| $LaNi_5$ | 5.0125 | 3.9838 | 86.684 | >33 | 27 | 52 | 369 |
| Invention* | 5.0333 | 3.9963 | 87.677 | 6.3 | 354 | 381 | 409 |

Figure 4A:
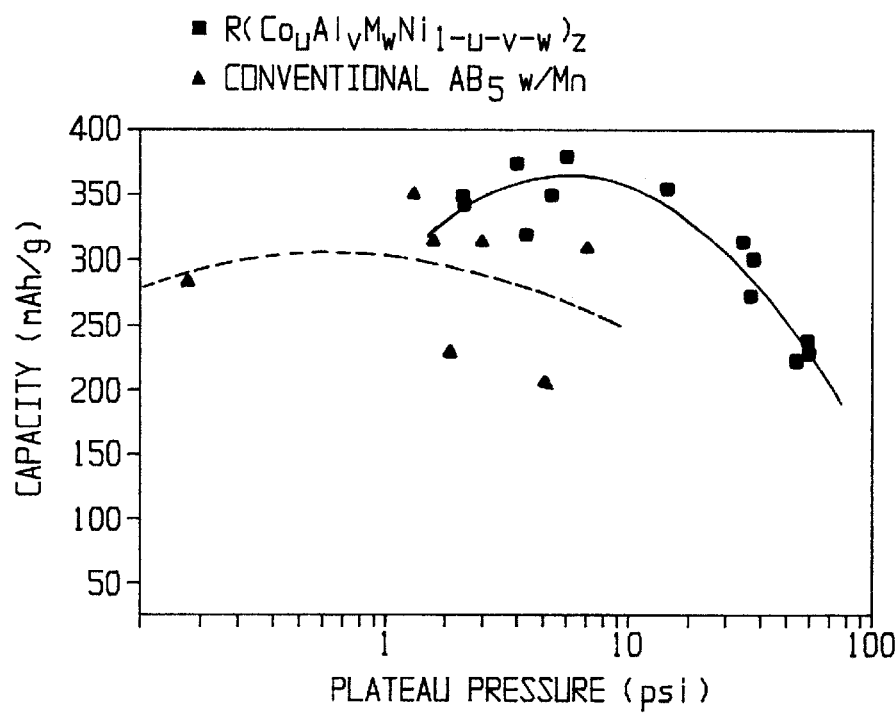
FIGS. 4(a), 4(b), 4(c) and 4(d) illustrate the relationship between the discharging capacity and plateau pressure of $R(Co_uAl_vM_wNi_{1-u-v-w})_z$.
Figure 4B:
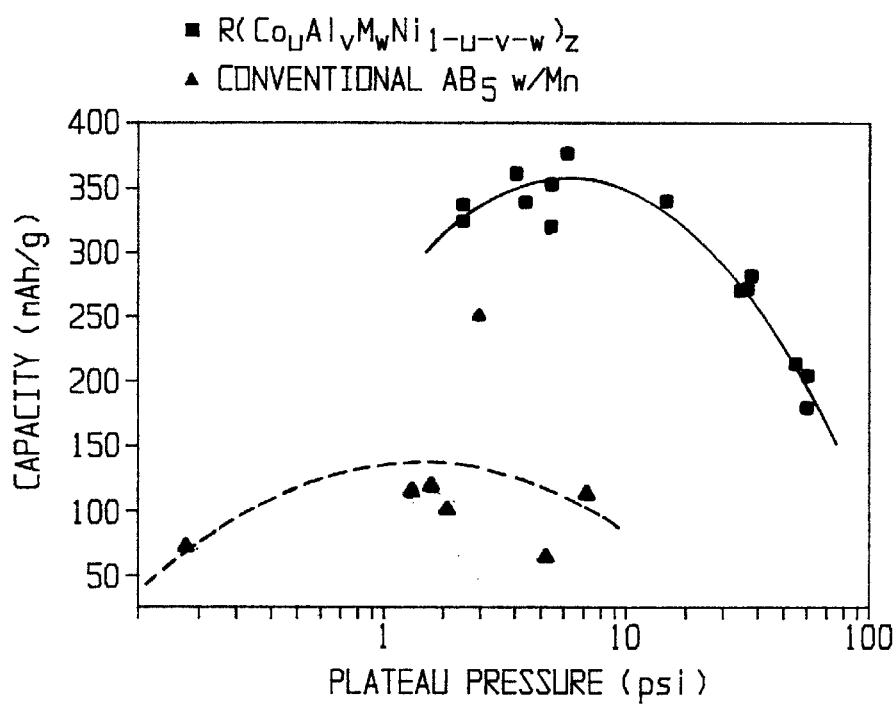
Figure 4C:
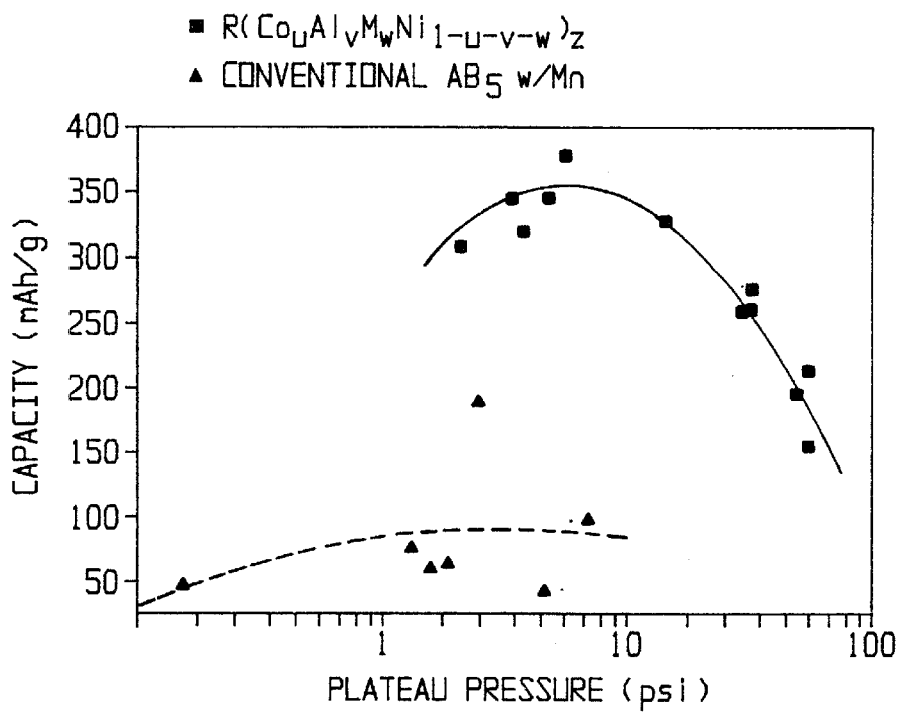
Figure 4D:
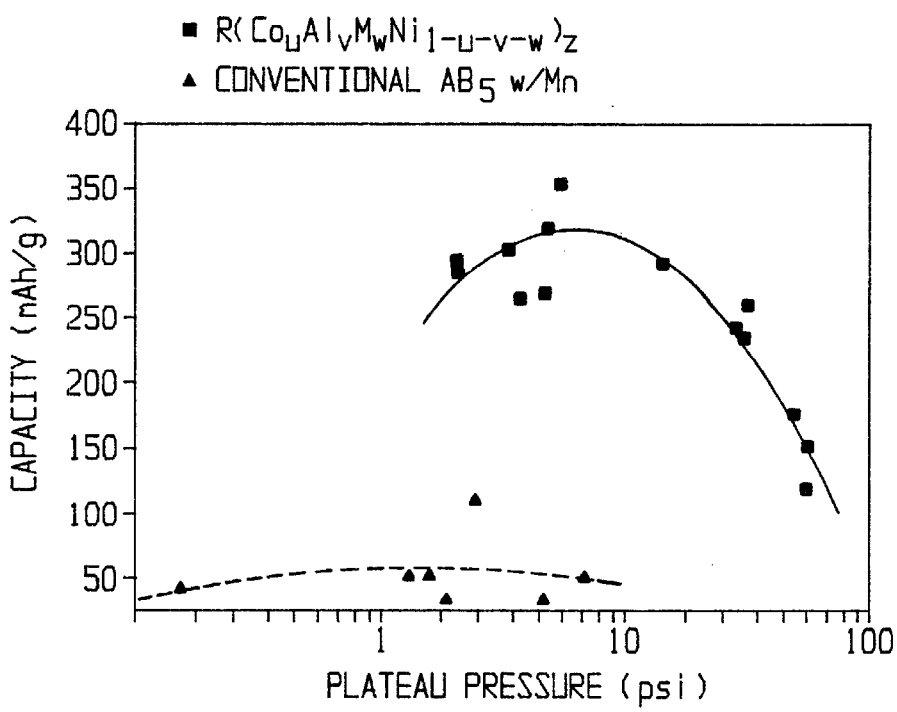
Figure 5:
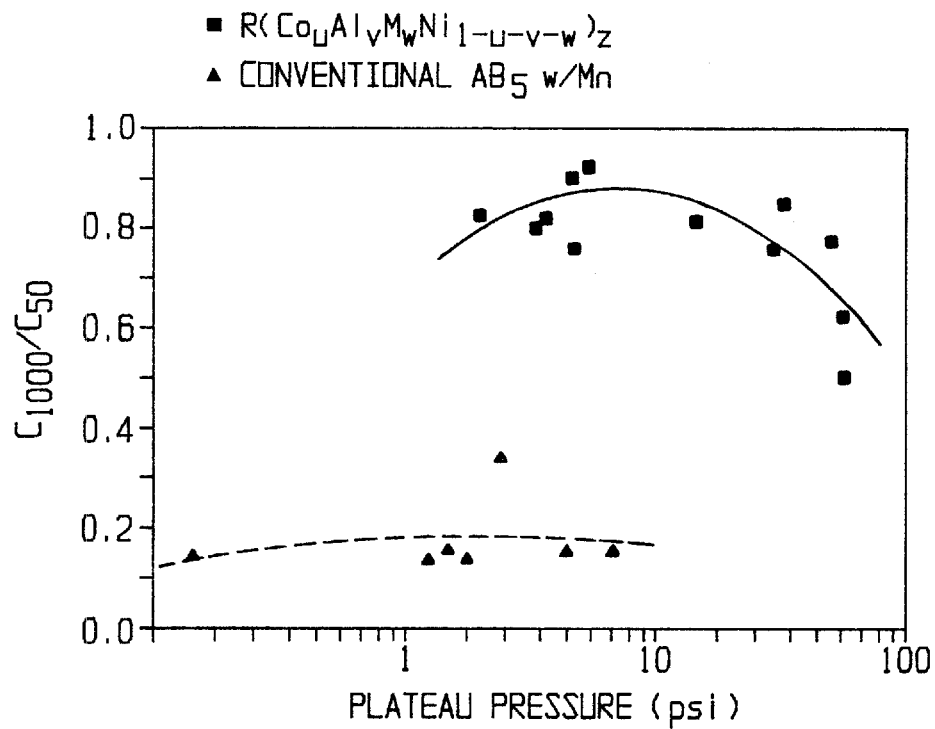
FIG. 5 is a comparison of the impact of the plateau pressure to the $C_{100}/C_{50}$ ratio for $R(Co_uAl_vM_wNi_{1-u-v-w})_z$ and a conventional AB₅ with Mn.

Note *: Nominal alloy composition of $La(Co_{0.10}Al_{0.03}Cr_{0.01}Ni_{0.86})_{5.1}$ Shown in FIGS. 4(a), (b), (c) and (d) are the relationship of the discharging capacity and plateau pressure of many Mn-free $AB_5$ alloys and counter conventionally $AB_5$ alloys containing Mn discharged at rates of 50, 250, 500 and 1000 mA/g. At a discharging rate of 50 mA/g, the Mn-free alloys all exhibit slightly higher discharging capacities when compared to counter alloys at equivalent plateau pressures. This difference in discharging capacity becomes more pronounced when the discharge rate is increased to 250, 500 or 1000 mA/g. When the plateau pressure is between 3 to 10 apsi, it is clear that Mn-free $AB_5$ alloys exhibit a higher discharging capacity. This relationship can further be expressed by the ratio of capacity at 1000 to that of 50 mA/g, i.e., $C_{1000}/C_{50}$, shown in FIG. 5. The Mn-free alloys all exhibit a $C_{1000}/C_{50}$ ratio of greater than 0.6 while the conventional alloys all exhibit a $C_{50}/C_{1000}$ ratio of less than 0.4. It is also clear that the most significant improvement in $C_{1000}/C_{50}$ ratios all occur between the plateau pressure of 3 to 10 apsi. Mn-free alloys with plateau pressure within this range appear to be the most attractive for the high discharge rate applications.

Figure 6:
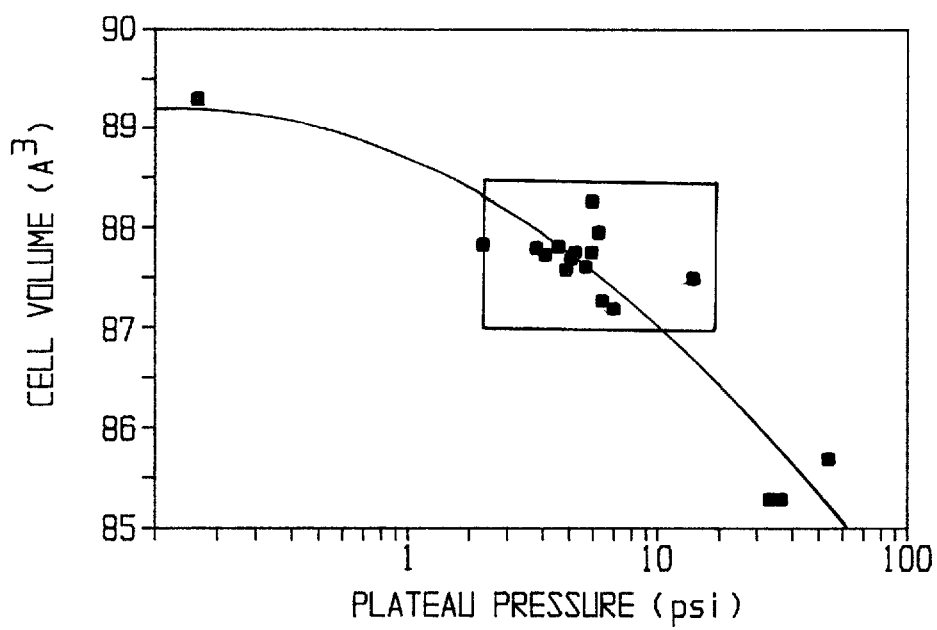
FIG. 6 illustrates the relationship between unit cell volume and plateau pressure of $R(Co_uAl_vM_wNi_{1-u-v-w})_z$ type AB₅ alloys at 25° C.

Shown in FIG. 6 is the relationship between the unit cell volume and the plateau pressure of Mn-free alloys at 25° C. Most of the Mn-free alloys with unit cell volume ranging between 87 to 88.5 $A^3$ exhibit a plateau pressure of 3 to 10 apsi, which is most attractive for high discharging rate battery applications.

Example 1

The invented alloy series $La(Co_{0.1}Al_{0.03}Cr_xNi_{ba1})_5$, where x=0, 0.01, 0.02 and 0.03, and the controlled alloy $(La_{0.32}Ce_{0.49}Nd_{0.14}Pr_{0.04})(Co_{0.12}Al_{0.06}Mn_{0.1}Ni_{0.72})_{5.1}$ are prepared by vacuum induction melting and mold casting. The unit cell volumes are calculated based on the lattice parameters determined by x-ray diffraction (XRD). The plateau pressure and theoretical capacity at 30 psi are determined and converted, respectively, from the PCT curve measured at 25° C. The electrochemical tests are conducted at 50, 500 and 1000 mA/g to determine the characteristics of high rate discharging. As illustrated by the results presented in Table D, alloys of this invention all exhibit a $C_{1000}/C_{50}$ ratio of greater than 0.80, while the control sample demonstrates a $C_{1000}/C_{50}$ of merely 0.15.

TABLE D

| Cr | Plateau Pressure | PCT Capacity (30 apsi) | Cell Volume | Discharging Capacity (mA/g) | | | |
|---|---|---|---|---|---|---|---|
| x | apsi | mAh/gm | $A^3$ | 50 | 500 | 1000 | $C_{1000}/C_{50}$ |
| 0 | 5.1 | 366 | 87.735 | 321 | 317 | 263 | 0.82 |
| 0.01 | 7.2 | 365 | 87.618 | 380 | 375 | 350 | 0.92 |
| 0.02 | 6.4 | 363 | 87.757 | 352 | 346 | 317 | 0.90 |
| 0.03 | 3.0 | 383 | 87.832 | 345 | 304 | 283 | 0.82 |
| control | 1.5 | 311 | 88.31 | 340 | 75 | 50 | 0.15 |

Example 2

The hydrogen absorbing alloy series $La(Co_y Al_{0.03} Cr_{0.01} Ni_{ba1})_5$, where y=0, 0.08, 0.15 and 0.18, and the controlled alloy $(La_{0.32} Ce_{0.49} Nd_{0.14} Pr_{0.04})(Co_{0.12} Al_{0.06} Mn_{0.1} Ni_{0.72})_{5.1}$ are prepared by vacuum induction melting and mold casting. The unit cell volumes are calculated from the lattice parameters determined by XRD. The plateau pressure and theoretical capacity at 30 psi are determined and converted, respectively, from the PCT curves measured at 25° C. The electrochemical tests are conducted at 50, 500 and 1000 mA/g to determine the characteristics of high rate discharging. As illustrated by the results presented in Table E, alloys of this invention all exhibit a $C_{1000}/C_{50}$ ratio of greater than 0.80, while the control sample demonstrates a $C_{1000}/C_{50}$ of merely 0.15.

TABLE E

| Co | Plateau Pressure | PCT Capacity (30 apsi) | Cell Volume | Discharging Capacity (mA/g) | | | |
|---|---|---|---|---|---|---|---|
| y | apsi | mAh/gm | $A^3$ | 50 | 500 | 1000 | $C_{1000}/C_{50}$ |
| 0 | 16.8 | 383 | 87.512 | 356 | 325 | 290 | 0.81 |
| 0.08 | 6.3 | 387 | 87.677 | 349 | 342 | 295 | 0.85 |
| 0.15 | 4.7 | 385 | 87.814 | 375 | 342 | 300 | 0.80 |
| 0.18 | 3.0 | 387 | 87.885 | 350 | 342 | 292 | 0.83 |
| control | 1.5 | 311 | 88.31 | 340 | 75 | 50 | 0.15 |

Example 3

The hydrogen-absorbing alloy series $R(Co_{0.1} Al_{0.03} Cr_{0.01} Ni_{ba1})_5$, where R is a mixture of La, Ce, Nd and Pr in a designated proportion, and the controlled alloy with a nominal composition of $(La_{0.32} Ce_{0.49} Nd_{0.14} Pr_{0.04})(Co_{0.12} Al_{0.06} Mn_{0.1} Ni_{0.72})_{5.1}$ are prepared by vacuum induction melting and mold casting. The unit cell volumes are calculated from the lattice parameters determined by XRD. The plateau pressure and theoretical capacity at 30 psi are determined and converted from the PCT measurement at 25° C. The electrochemical tests are conducted at 50, 500 and 1000 mA/g to determine the characteristics of high rate discharging. As illustrated by the results presented in Table F, alloys of this invention all exhibit a $C_{1000}/C_{50}$ ratio of greater than 0.70 while the control sample demonstrates a $C_{1000}/C_{50}$ of merely 0.15. Despite some of the invented alloys demonstrating a discharging capacity of as low as 225 or 230 mA/g when measured at discharging rate of 50 mA/g, the higher $C_{1000}/C_{50}$ ratio still results in a higher discharging capacity at discharging rate of 1000 mA/g when compared to that of the control alloy.

TABLE F

| Alloy Code | Plateau Pressure | PCT Capacity (30 apsi) | Cell Volume | Discharging Capacity (mA/g) | | | |
|---|---|---|---|---|---|---|---|
| | apsi | mAh/gm | $A^3$ | 50 | 500 | 1000 | $C_{1000}/C_{50}$ |
| A | 34.8 | 48 | 87.330 | 302 | 280 | 258 | 0.85 |
| B | 31.9 | 103 | 87.311 | 318 | 258 | 241 | 0.76 |
| C | 50.8 | 34 | 87.737 | 225 | 195 | 175 | 0.78 |
| D | 32.6 | 72 | 87.295 | 295 | 283 | 255 | 0.86 |
| control | 1.5 | 311 | 88.310 | 340 | 75 | 50 | 0.15 |

Notes:
Alloy A: $(La_{0.41} Ce_{0.10} Nd_{0.40} Pr_{0.10})(Co_{0.1} Al_{0.03} Cr_{0.01} Ni_{0.86})_5$
Alloy B: $(La_{0.41} Ce_{0.12} Nd_{0.16} Pr_{0.30})(Co_{0.1} Al_{0.03} Cr_{0.01} Ni_{0.86})_5$
Alloy C: $(La_{0.41} Ce_{0.18} Nd_{0.10} Pr_{0.10})(Co_{0.1} Al_{0.03} Cr_{0.01} Ni_{0.86})_5$
Alloy D: $(La_{0.64} Ce_{0.26} Nd_{0.08} Pr_{0.03})(Co_{0.1} Al_{0.03} Cr_{0.01} Ni_{0.86})_5$

Example 4

The hydrogen-absorbing alloy series with nominal compositions of $La(Co_{0.1} Al_{0.03} M_u Ni_{0.87-u})_5$, where M=Ti, Nb, Cr and Mo, and u=0, 0.01, 0.02 and 0.03, are prepared by the conventional vacuum induction melting and mold casting. XRD is employed to determine the lattice parameters and, subsequently to calculate the unit cell volume. Hydrogen storage capacity is extrapolated from the PCT curves measured at 25° C. Shown in Table G are the lattice parameters and plateau pressure of these alloys. All of these alloys exhibit a unit cell volume of about 87.58±0.39 $A^3$ and the plateau pressure at 25° C. ranges from about 3 to 8.5 apsi. Listed in Table H are the hydrogen storage capacities and calculated reversible capacities at 25° C. Most alloys exhibit a hydrogen storage capacity of more than 300 mAg/h at 25° C. and are attractive for rechargeable batteries.

TABLE G

Plateau pressures and lattice parameters of the $La(Co_{0.1} Al_{0.03} M_u Ni_{0.87-u})_5$ alloy series.

| | | Lattice Parameters | | | | Plateau Pressure (psi) @ 25° C. |
|---|---|---|---|---|---|---|
| M | $\mu$ | a (Å) | b (Å) | c (Å) | Volume ($Å^3$) | |
| — | 0 | 5.0334 | 5.0334 | 3.9987 | 87.735 | 5.10 |
| Ti | 0.01 | 5.0318 | 5.0318 | 3.9946 | 87.589 | 6.06 |
| | 0.02 | 5.0350 | 5.0350 | 3.9953 | 87.717 | 6.27 |
| | 0.03 | 5.0355 | 5.0355 | 3.9994 | 87.824 | 5.64 |
| Nb | 0.01 | 5.0259 | 5.0259 | 3.9906 | 87.296 | 8.10 |
| | 0.02 | 5.0397 | 5.0397 | 3.9987 | 87.957 | 7.76 |
| | 0.03 | 5.0494 | 5.0494 | 3.9978 | 88.273 | 7.42 |
| Cr | 0.01 | 5.0303 | 5.0303 | 3.9983 | 87.618 | 6.43 |
| | 0.02 | 5.0348 | 5.0348 | 3.9974 | 87.757 | 6.35 |
| | 0.03 | 5.0353 | 5.0353 | 4.0001 | 87.832 | 3.00 |
| Mo | 0.02 | 5.0353 | 5.0353 | 3.9968 | 87.760 | 7.44 |
| | 0.03 | 5.0354 | 5.0354 | 3.9982 | 87.794 | 6.60 |

TABLE H

Composition of hydrogen storage capacity at 15, 30, and 100 apsi and reversible capacity of $La(Co_{0.1} Al_{0.03} M_u Ni_{0.87-u})_5$ measured at 25° C.

| M | $\mu$ | Capacity @ 15 apsi mAh/g | Capacity @ 30 apsi mAh/g | Capacity @ 100 apsi mAh/g | Reversible Capacity mAh/g |
|---|---|---|---|---|---|
| — | 0 | 332.70 | 366.37 | 389.39 | 248.65 |
| Ti | 0.01 | 338.80 | 368.29 | 389.67 | 250.29 |

TABLE H-continued

Composition of hydrogen storage capacity at 15, 30, and 100 apsi and reversible capacity of La(Co$_{0.1}$Al$_{0.03}$M$_v$Ni$_{0.87-w}$)$_z$ measured at 25° C.

| M | $\mu$ | Capacity @ 15 apsi mAh/g | Capacity @ 30 apsi mAh/g | Capacity @ 100 apsi mAh/g | Reversible Capacity mAh/g |
|---|---|---|---|---|---|
|  | 0.02 | 309.81 | 337.50 | 359.14 | 245.29 |
|  | 0.03 | 271.62 | 307.42 | 335.13 | 202.79 |
| Nb | 0.01 | 318.03 | 349.12 | 370.41 | 203.9 |
|  | 0.02 | 281.69 | 312.45 | 337.82 | 160.92 |
|  | 0.03 | 252.52 | 288.97 | 311.31 | 188.49 |
| Cr | 0.01 | 312.41 | 365.03 | 395.04 | 233.86 |
|  | 0.02 | 336.12 | 362.99 | 381.39 | 244.89 |
|  | 0.03 | 359.29 | 383.06 | 405.29 | 214.5 |
| Mo | 0.02 | 320.76 | 369.62 | 392.67 | 285.81 |
|  | 0.03 | 329.84 | 364.06 | 388.04 | 249.43 |

The present invention, therefore, provides manganese-free rare earth-transition metal AB$_5$-type hydrogen-absorbing alloys having favorable high rate discharge characteristics, suitable for use in applications such as rechargeable batteries for electrical vehicles or hybrid electrical vehicles.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

What is claimed is:

1. A hydrogen-absorbing alloy for a battery, said alloy consisting essentially of a composition represented by a general formula:

$$R(Co_u Al_v M_w Ni_{1-u-v-w})_z \quad (I)$$

where
R is at least one element selected from the group consisting of rare earth elements and Y,
M is at least one refractory metal selected from Groups IVB, VB, and VIB of the periodic table,
u is from 0 to 0.25,
v is from 0 to 0.10,
w is from 0.01 to 0.03 and
z, the ratio of (Co$_u$Al$_v$M$_w$Ni$_{1-u-v-w}$)/R, is from 4.70 to 5.50; and wherein the composition is essentially free of Mn.

2. The hydrogen-absorbing alloy according to claim 1, wherein said composition has a unit cell volume ranging from 87 to 88.5 Å$^3$ and a plateau pressure from 1 to 60 apsi at 25° C.

3. The hydrogen-absorbing alloy according to claim 2, wherein said plateau pressure is from about 3 to about 10 apsi.

4. The hydrogen-absorbing alloy according to claim 1, wherein said R is at least one element selected from the group consisting of La, Ce, Pr, Nd, Pm, Sm, Eu, Gd, Tb, Dy, Ho, Er, Tm, Yb, Lu, and Y.

5. The hydrogen-absorbing alloy according to claim 1, wherein said R is at least one element selected from the group consisting of La, Ce, Nd, Pr, and Sm.

6. The hydrogen-absorbing alloy according to claim 1, wherein said R is La.

7. The hydrogen-absorbing alloy according to claim 1, wherein said M is at least one element selected from the group consisting of Ti, V, Cr, Zr, Nb, Mo, Hf, Ta, and W.

8. The hydrogen-absorbing alloy according to claim 1, wherein said u is from 0 to 0.15, said v is from 0 to 0.06, and said z is from 4.9 to 5.35.

9. The hydrogen-absorbing alloy according to claim 1, wherein said u is from 0 to 0.15, said v is from 0 to 0.06, said w is from 0.01 to 0.02, and said z is from 5 to 5.15.

10. The hydrogen-absorbing alloy according to claim 1, wherein said u is from 0.01 to 0.2, said v is from 0.001 to 0.05, and said z is from 4.85 to 5.45.

11. The hydrogen-absorbing alloy according to claim 1, wherein said u is from 0.05 to 0.2, said v is from 0.02 to 0.04, said w is from 0.01 to 0.02, and said z is from 4.9 to 5.2.

12. The hydrogen-absorbing alloy according to claim 1, wherein said alloy comprises at least one element selected from the group consisting of Pb, C, N, O, F, Cl, S, and P.

13. The hydrogen-absorbing alloy according to claim 12, wherein said element is present in an amount of 6000 ppm or less.

14. The hydrogen-absorbing alloy according to claim 1, wherein said alloy is isothermally heat treated at from 900 to 1100° C. for from 2 to 24 hours.

15. The hydrogen absorbing alloy of claim 1, wherein said alloy is in the form of a powder.

16. The hydrogen absorbing alloy of claim 1, wherein said alloy composition consists of the composition represented by the general formula:

$$R(Co_u Al_v M_w Ni_{1-u-v-w})_z \quad (I)$$

where
R is at least one element selected from the group consisting of rare earth elements and Y,
M is at least one refractory metal selected from Groups IVB, VB, and VIB of the periodic table,
u is from 0 to 0.25,
v is from 0 to 0.10,
w is from 0.01 to 0.03 and
z, the ratio of (Co$_u$Al$_v$M$_w$Ni$_{1-u-v-w}$)/R, is from 4.70 to 5.50; and wherein the composition is essentially free of Mn.

17. A hydrogen-absorbing alloy for a battery, said alloy consisting essentially of a composition represented by a general formula:

$$R\,Co_u Al_v M_w Ni_{z-u-v-w} \quad (II)$$

where
R is at least one element selected from the group consisting of rare earth elements and Y,
M is at least one refractory metal selected from Groups IVB, VB, and VIB of the periodic table,
u is from 0 to 1.375,
v is from 0 to 0.55,
w is from 0.0485 to 0.1635 and
z is from 4.70 to 5.50; and
wherein the composition is essentially free of Mn.

18. The hydrogen-absorbing alloy according to claim 17, wherein said u is from 0 to 0.8025, said v is from 0 to 0.321, said w is from 0.0485 to 0.1605, and said z is from 4.90 to 5.35.

19. The hydrogen-absorbing alloy according to claim 17, wherein said u is from 0 to 0.7725, said v is from 0 to 0.309, said w is from 0.0485 to 0.103, and said z is from 5.00 to 5.15.

20. The hydrogen-absorbing alloy according to claim 17, wherein said u is from 0.0485 to 1.09, said v is from 0.00485 to 0.2725, and said z is from 4.85 to 5.45.

21. The hydrogen-absorbing alloy according to claim 17, wherein said R is at least one element selected from the group consisting of La, Ce, Pr, Nd, Pm, Sm, Eu, Gd, Tb, Dy, Ho, Er, Tm, Yb, Lu, and Y.

22. The hydrogen-absorbing alloy according to claim 17, wherein said M is at least one element selected from the group consisting of Ti, V, Cr, Zr, Nb, Mo, Hf, Ta, and W.

23. The hydrogen-absorbing alloy according to claim 17, wherein said u is from 0.245 to 1.04, said v is from 0.098 to 0.208, said w is from 0.049 to 0.104, and said z is from 4.9 to 5.2.

24. The hydrogen absorbing alloy of claim 17, wherein said alloy is in the form of a powder.

25. The hydrogen absorbing alloy of claim 17, wherein said allow consists of a composition represented by the general formula:

$$R\,Co_u Al_v M_w Ni_{z-u-v-w} \tag{II}$$

where

R is at least one element selected from the group consisting of rare earth elements and Y, M is at least one refractory metal selected from Groups IVB, VB, and VIB of the periodic table, u is from 0 to 1.375, v is from 0 to 0.55, w is from 0.0485 to 0.1635 and z is from 4.70 to 5.50; and wherein the composition is essentially free of Mn.

* * * * *